(12) United States Patent
Hölzel et al.

(10) Patent No.: US 9,688,126 B2
(45) Date of Patent: Jun. 27, 2017

(54) ARRANGEMENT FOR A VEHICLE ROOF WITH A COVER

(71) Applicant: Webasto SE, Stockdorf (DE)

(72) Inventors: Dominik Hölzel, Olching (DE); Bernhard Wingen, Feldkirchen (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/913,030

(22) PCT Filed: Aug. 5, 2014

(86) PCT No.: PCT/EP2014/066825
§ 371 (c)(1),
(2) Date: Feb. 19, 2016

(87) PCT Pub. No.: WO2015/024774
PCT Pub. Date: Feb. 26, 2015

(65) Prior Publication Data
US 2016/0200183 A1    Jul. 14, 2016

(30) Foreign Application Priority Data

Aug. 22, 2013 (DE) ........................ 10 2013 109 097

(51) Int. Cl.
| | | |
|---|---|---|
| *B60J 7/047* | (2006.01) | |
| *B60J 7/057* | (2006.01) | |
| *B60J 7/043* | (2006.01) | |

(52) U.S. Cl.
CPC .................................. *B60J 7/0435* (2013.01)

(58) Field of Classification Search
CPC ..................................................... B60J 7/0435
(Continued)

(56) References Cited

U.S. PATENT DOCUMENTS

| 5,707,102 A | 1/1998 | Takahashi et al. |
|---|---|---|
| 2005/0231007 A1 | 10/2005 | Oechel |
| 2010/0164253 A1 | 7/2010 | Faerber et al. |

FOREIGN PATENT DOCUMENTS

| DE | 102004018461 A1 | 11/2005 |
|---|---|---|
| DE | 102005007031 A1 | 8/2006 |

(Continued)

OTHER PUBLICATIONS

International Search Report for PCT/EP2014/066825 mailed Oct. 24, 2014; English Translation submitted herewith (7 Pages).
(Continued)

*Primary Examiner* — Dennis H Pedder
(74) *Attorney, Agent, or Firm* — Fitch, Even, Tabin & Flannery LLP

(57) ABSTRACT

An arrangement for a vehicle roof having a cover which, starting from a closure position, can be raised for opening by deployment means in the rear region thereof and which can be displaced backward over the vehicle roof. The deployment means have a sliding member which can be displaced in the longitudinal direction of the vehicle by a drive and which has a first slotted guide. The deployment means also have a second slotted guide which is secured to the vehicle, and have a first control lever pivotably supported in the rear region on the cover and is coupled to the first slotted guide and the second slotted guide, so that, starting from the closure position of the cover, when the sliding member is displaced in the longitudinal direction of the vehicle, a movement of the cover in the longitudinal direction of the vehicle is initially locked by means of the first control lever.

10 Claims, 6 Drawing Sheets

(58) Field of Classification Search
USPC .................................. 296/216.02–216.05, 223
See application file for complete search history.

(56) References Cited

FOREIGN PATENT DOCUMENTS

| | | |
|---|---|---|
| DE | 102005030056 B3 | 8/2006 |
| DE | 102005007031 B4 | 5/2007 |
| EP | 2078630 A1 | 7/2009 |
| EP | 2554415 A1 | 2/2013 |
| JP | 2010-247572 A | 11/2010 |
| WO | 2007/079747 A1 | 7/2007 |

OTHER PUBLICATIONS

Examination Report for corresponding JP Patent Application was issued on Jan. 31, 2017.

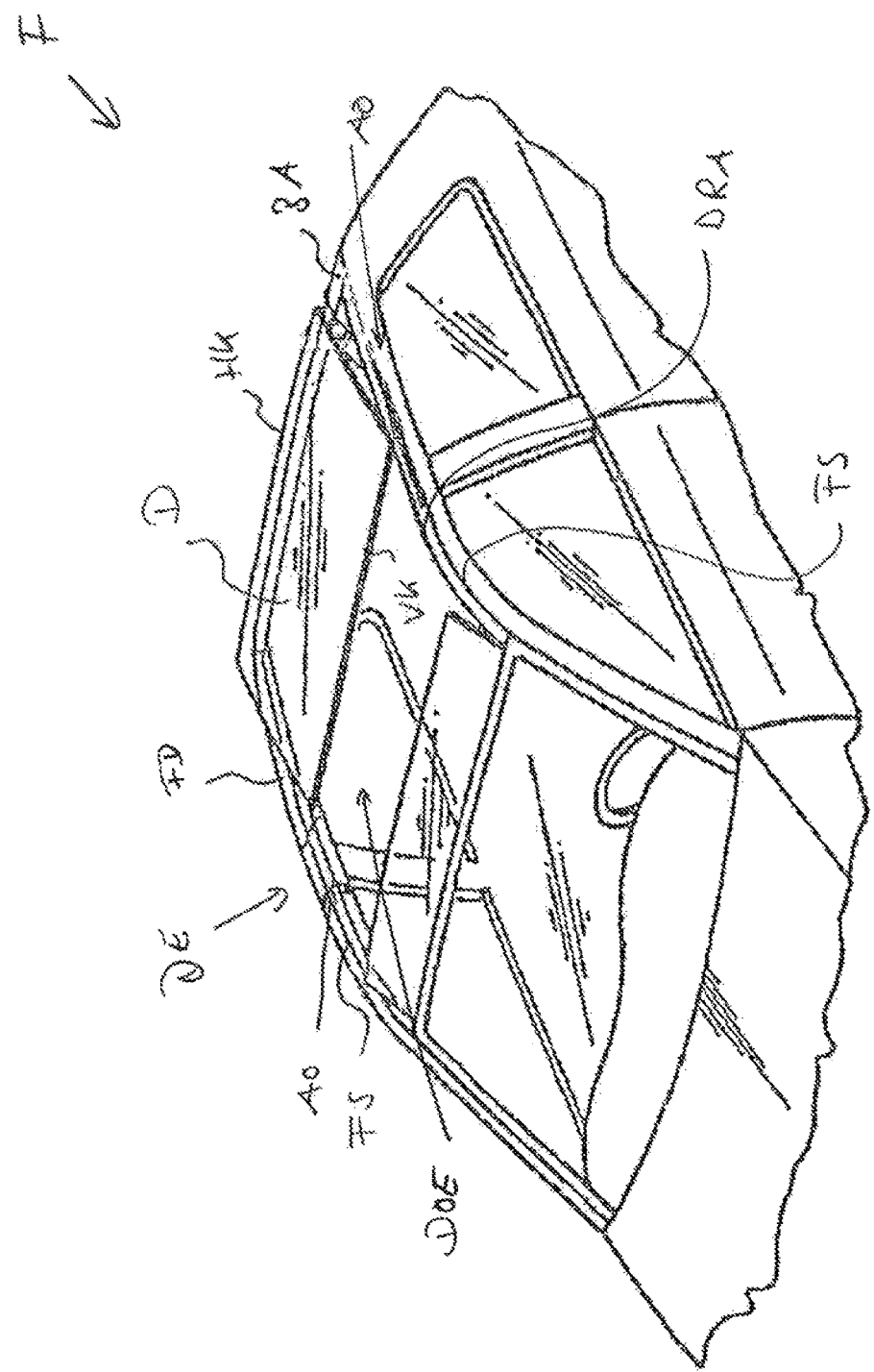

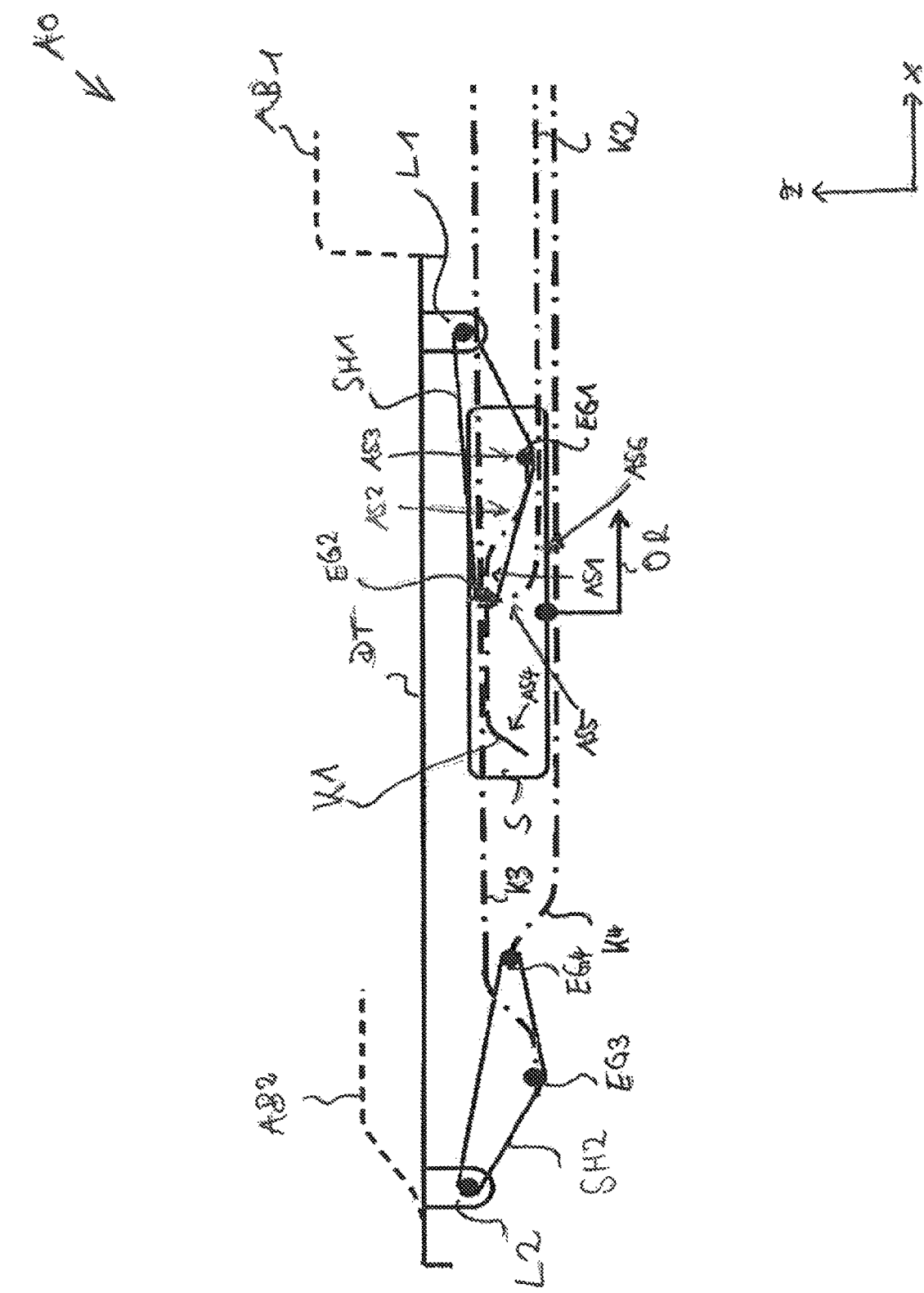

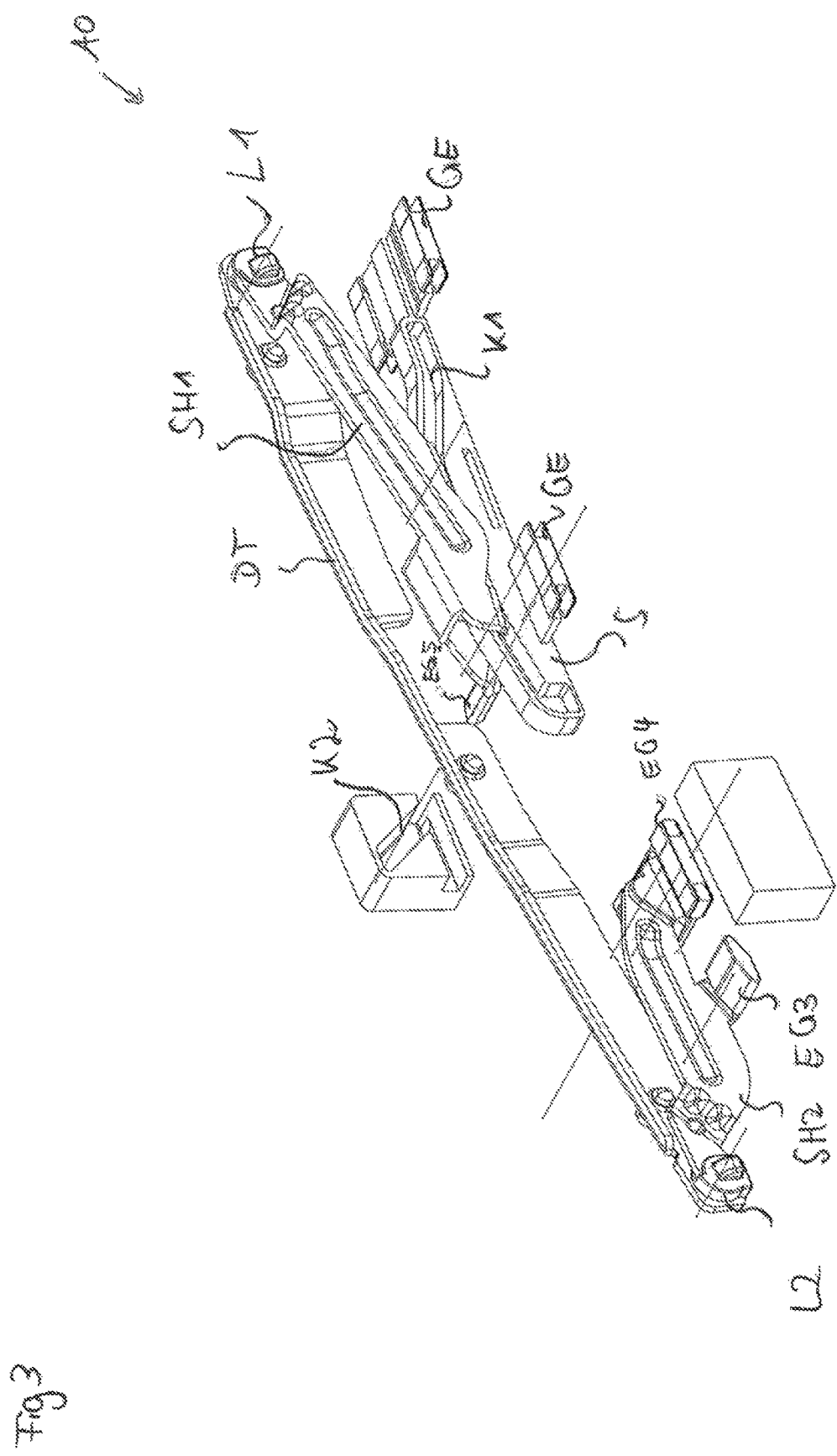

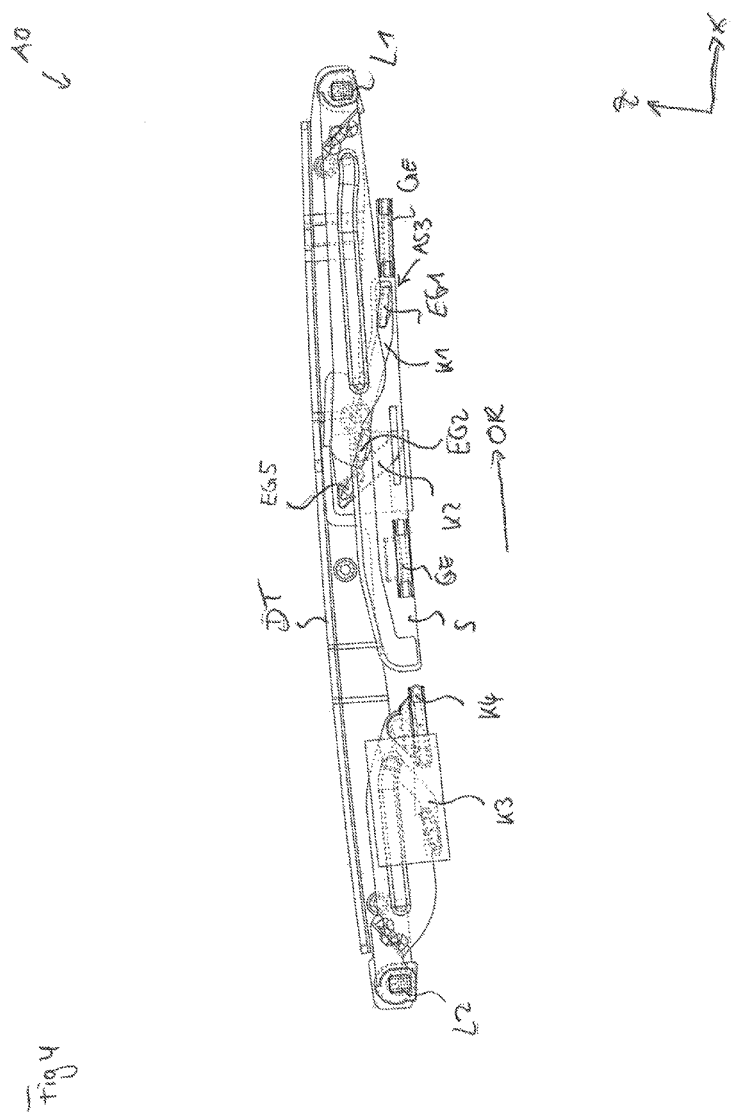

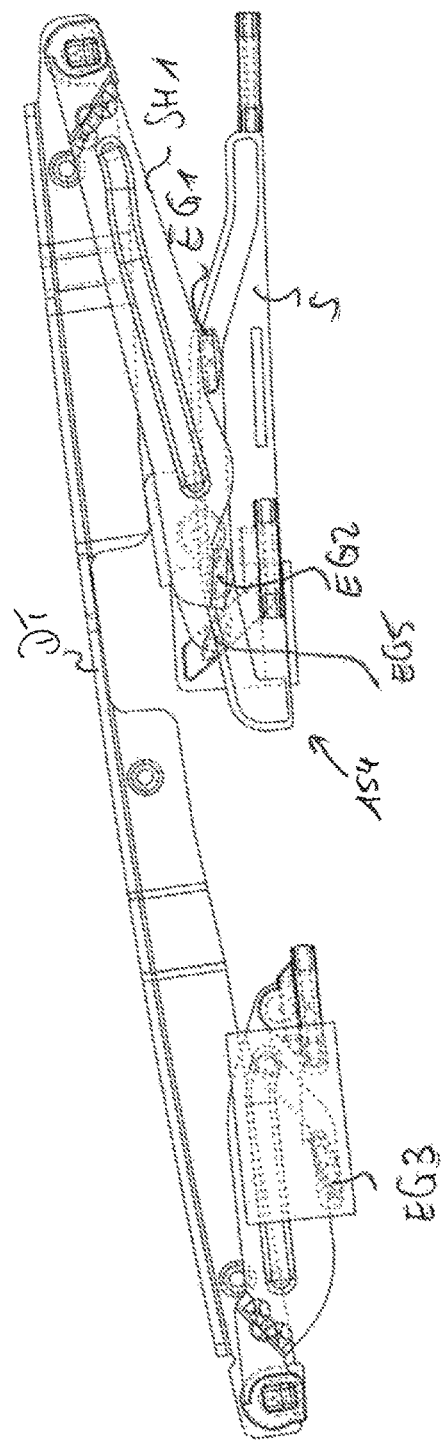

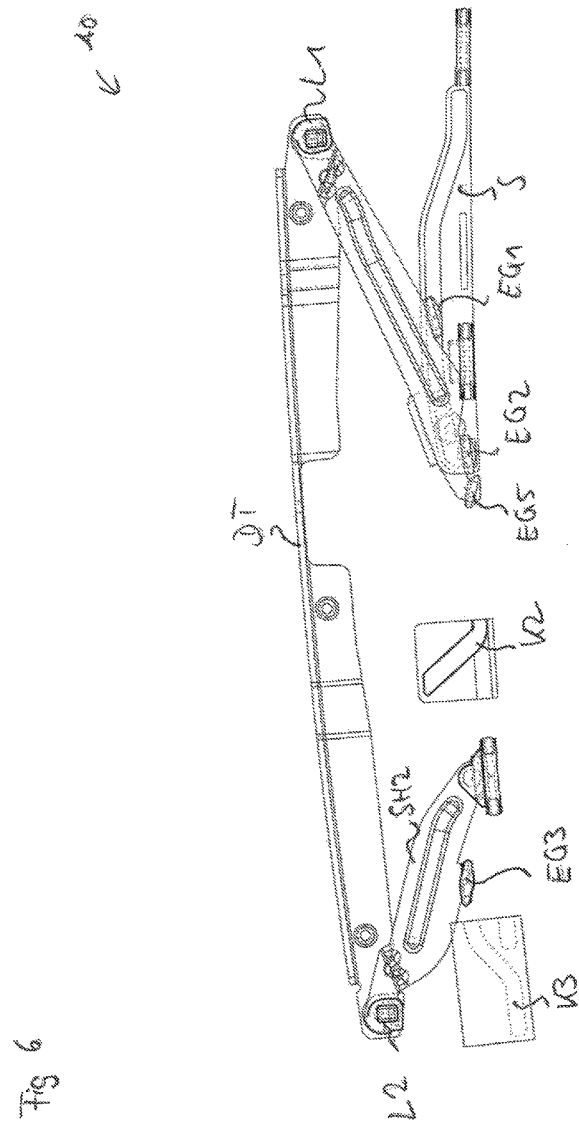

ARRANGEMENT FOR A VEHICLE ROOF WITH A COVER

CROSS REFERENCE TO RELATED APPLICATIONS

This application is a U.S. national phase application filed under 35 U.S.C. §371 of International Application No. PCT/EP2014/066825, filed Aug. 5, 2014, designating the United States, which claims priority from German Patent Application No. 10 2013 109 097.4, filed Aug. 22, 2013, which are hereby incorporated herein by reference in their entirety for all purposes.

FIELD

The invention relates to an arrangement for a vehicle roof having a cover which, starting from a closure position for closing a roof opening, can be raised for opening by deployment means in the rear region thereof and can be displaced backward into an open position.

BACKGROUND

Many such arrangements for a vehicle roof having a cover are known from the prior art. Conventionally, during the opening operation, a drive sliding member is displaced in the longitudinal direction of the vehicle. In lateral regions of the cover, deployment means are provided in order to raise the cover before it is displaced further backward into an open position.

If the cover is located in a closure position, in which the cover closes a roof opening of a vehicle, the cover is generally locked against raising and/or displacement in order, for example, not to afford unauthorized persons access to the inner side of the vehicle. In order to lock the cover or the mechanism thereof, special locking elements, such as, for example, locking levers or bolts, are generally used.

An object of the invention is to describe an arrangement for a vehicle roof having a cover and a vehicle roof which is characterized by means of simplified kinematics for deployment and displacement of the cover and which requires little structural space.

SUMMARY

According to the invention, there is described an arrangement for a vehicle roof having a cover which, starting from a closure position for closing a roof opening, can be raised for opening by deployment means in the rear region thereof and which can be displaced backward over the vehicle roof into an open position. The deployment means have a sliding member which can be displaced in the longitudinal direction of the vehicle by means of a drive and which has a first slotted guide. The deployment means further have a second slotted guide which is secured to the vehicle. Finally, the deployment means have a first control lever which is pivotably supported in the rear region on the cover and which is coupled to the first slotted guide and the second slotted guide so that, starting from the closure position of the cover, when the sliding member is displaced in the longitudinal direction of the vehicle, a movement of the cover in the longitudinal direction of the vehicle is initially locked by means of the first control lever.

The displacement of the cover over the vehicle roof means that the cover after being raised or deployed in the region of a rear edge of the cover is pushed over an outer side of the vehicle roof.

The location indications or direction indications used such as "rear" or "forward" refer to a longitudinal direction of the vehicle. The vehicle longitudinal direction can also be referred to as a horizontal direction or X direction. The deployment or raising of the cover is carried out substantially in a vertical direction or Z direction. The rear region of the cover is intended to be understood to be the region which faces a vehicle rear from a center of the cover.

The arrangement makes provision for the first control lever, which can also be referred to as a rear deployment lever, to be supported in a fixed and pivotable manner on the cover and to be coupled to the first and second slotted guide. If the cover is in a closure position, it is not possible to raise the cover in a vertical direction or to displace it in the longitudinal direction of the vehicle without damaging it. This is a result of the fact that the first control lever is mechanically coupled to the first and the second slotted guide.

If the sliding member is displaced by means of the drive, a displacement of the cover, that is to say, substantially parallel with the longitudinal direction of the vehicle, is initially blocked by means of the mechanical coupling of the first control lever to the second slotted guide which is secured to the vehicle. This is also referred to as X locking. The locking of the cover in the vertical direction, that is to say, the Z locking, is in contrast released so that the cover is deployed vertically in the rear region. Only with further displacement of the sliding member is the X locking also released and the cover also displaced in the longitudinal direction of the vehicle.

That is to say, when the sliding member is displaced in a first movement portion, a vertical movement of the cover in the rear region is initially controlled, whilst a movement of the cover in the X direction is locked by means of the first control lever. In a second movement portion of the sliding member, that is to say, with further displacement of the sliding member, a movement of the cover in the X direction is released.

The locking is consequently carried out substantially exclusively by means of the first control lever. For the X locking when the sliding member is displaced from the closure position of the cover, it is simply necessary to provide a second slotted guide which is secured to the vehicle, whereby in particular no further locking elements, for example, additional levers or pins, are required and consequently costs are saved. In addition, there is required less structural space, which would be required, for example, for an additional locking element and the movement thereof. In addition, a stable and mechanically secure construction of the arrangement is possible so that, for example, wind forces at a high vehicle speed, for example, of up to 250 km/h, can be compensated for.

Furthermore, in a closure position of the cover, the X locking of the cover or the cover mechanism is not produced by means of a second control lever. This would generally result in a very long and very large (control) sliding member in order to be able to control both the first control lever and the second control lever, which can also be referred to as the front deployment lever. This would require a lot of material for the sliding member and result in high costs. In addition, an S movement of the front cover edge could not be carried out.

The arrangement according to the first aspect, when a second control lever is provided, enables an S movement of the front cover edge to be carried out. The S movement is required in order to push the cover or a covering element in the region of a front edge of the cover below the roof skin.

The cover is thereby mechanically secured to the vehicle in a reliable manner and can terminate flush with an outer side of the vehicle roof. Consequently, wind forces can be compensated for in a particularly effective manner. When the cover is opened, the cover or the covering element is first pushed out substantially parallel with the longitudinal direction of the vehicle below the roof skin, subsequently raised with the displacement being continued and ultimately again displaced substantially parallel with the longitudinal direction of the vehicle so that the cover can be moved into an open position.

According to an embodiment of the invention, the first slotted guide is arranged in a fixed manner on the sliding member. This enables an integral construction of the sliding member with the first slotted guide.

According to another embodiment, the first control lever has three engagement elements for coupling to the first slotted guide and the second slotted guide, wherein two engagement elements are in engagement with the first slotted guide and one engagement element is in engagement with the second slotted guide.

According to another embodiment of the invention, in the closure position of the cover, a path of the second slotted guide extends in a front portion in such a manner that a distance between the second slotted guide and the cover changes and subsequently the distance between the second slotted guide and the cover remains substantially the same. In the closure position of the cover, the first slotted guide has in a front portion a path in which the distance changes with respect to the cover. In this instance, the path in the front portion of the second slotted guide may also extend substantially vertically, that is to say, perpendicularly relative to the longitudinal direction of the vehicle, before the path extends substantially parallel with the longitudinal direction of the vehicle. The path of the first slotted guide may extend substantially vertically in the rear portion.

For example, the distance with respect to the cover may decrease or increase in a backward direction.

According to another embodiment of the invention, in the closure position of the cover, a path of the first slotted guide extends in a rear portion in such a manner that a distance between the first slotted guide and the cover increases in a backward direction.

It is thereby possible that, when the sliding member is displaced, initially substantially only a vertical movement of the cover is controlled by means of the path of the first slotted guide. Consequently, initially the vertical movement, that is to say, no movement in the longitudinal direction of the vehicle, of the cover is forced before the cover can subsequently be displaced in the longitudinal direction of the vehicle and opened.

According to an embodiment of the invention, the rear portion of the first slotted guide and/or the front portion of the second slotted guide has/have a curved and/or ramp-like path.

This ensures friction-free displacement and raising of the cover together with the fewest possible forces. In addition, the production of noise is consequently prevented. In addition, by means of such slotted guide paths, the raising or pivoting of a cover can be carried out.

According to another embodiment, the two engagement elements which are in engagement with the first slotted guide are arranged in different planes parallel with the cover in the closure position of the cover.

According to another embodiment, the rear portion of the first slotted guide has a first portion, which extends parallel with the longitudinal direction of the vehicle, a second portion which adjoins the first portion and which extends in a ramp-like and/or curved manner, and a third portion which adjoins the second portion and which extends substantially parallel with the longitudinal direction of the vehicle, wherein the first portion in comparison with the third portion has a smaller distance with respect to the cover.

According to another embodiment, in the closure position of the cover, one of the two engagement elements which is in engagement with the first slotted guide and which is located closer to the fixed bearing of the first control lever is located in this case in the third portion and the other of the two engagement elements is located in the first portion.

It is thereby possible, when the sliding member is displaced, to initially force a vertical movement of the cover. This is a result of the fact that, as a result of the configuration of the first slotted guide, the two engagement elements which are in engagement with the first slotted guide are initially substantially controlled or guided into the same plane. Such a simple geometry of the first slotted guide is simple to manufacture or produce and is further cost-effective in terms of assembly.

According to another embodiment, the front portion of the second slotted guide has a first portion which extends backward with increasing distance from the cover, and a second portion which adjoins the first portion and which extends substantially parallel with the longitudinal direction of the vehicle. In the closure position of the cover, a movement or a displacement of the cover in the longitudinal direction of the vehicle is consequently prevented or locked. In a similar manner to the first slotted guide, the geometry of the second slotted guide is simple to produce or manufacture and also cost-effective in terms of assembly.

In another embodiment, the deployment means further have a second control lever, which in a front region is supported on the cover in a fixed and pivotable manner has two additional engagement elements which are each in engagement with another slotted guide which is secured to the vehicle, wherein at least one slotted guide which is secured to the vehicle in a front portion has a path with distance which decreases to the rear with respect to the cover. By means of the second control lever and the additional slotted guides which are secured to the vehicle, it is possible, in particular in the front cover region, to force a so-called S movement.

Other advantageous embodiments are disclosed in the following extensive description of an embodiment and the dependent claims.

BRIEF DESCRIPTIONS OF THE DRAWINGS

The embodiment is described below with reference to the appended Figures.

In the Figures:

FIG. 1 is a schematic, perspective view of a vehicle roof,

FIG. 2 is a schematic illustration of a kinematic principle of an arrangement for the vehicle roof, FIG. 3 is a schematic, perspective exploded view of the arrangement, FIG. 4 is a schematic, two-dimensional view of the arrangement in a closure position, FIG. 5 is a schematic, two-dimensional view of the arrangement in a ventilator position, FIG. 6 is a schematic, two-dimensional view of the arrangement in an open position.

Elements or features of the same construction or function are given the same reference numerals throughout the Figures. Elements or features which have already been described with reference numerals are not necessarily provided with reference numerals in all the Figures.

DETAILED DESCRIPTION

FIG. 1 is a schematic, perspective view of a vehicle roof FD of a vehicle F which has a securing portion BA which is secured to the vehicle and which is constructed as a roof shell. The securing portion BA which is secured to the vehicle is provided with a roof opening DOE which is either closed by means of an adjustable, movable roof element DE or can be at least partially released.

The roof opening DOE is limited by a roof frame portion DRA which is constructed on the vehicle roof FD. The roof frame portion DRA preferably has guide rails FS which are arranged at both sides. The roof element DE is coupled to the guide rails FS or displaceably supported in the guide rails FS.

The movable roof element DE has a cover D and sliding elements, by means of which the movable roof element DE is supported with the cover D so as to slide in the guide rails FS. The cover D is preferably constructed as a glass cover.

In the vehicle roof FD in the region of the guide rails FS there are arranged arrangements AO which serve to displace the cover D, which closes the roof opening DOE of the vehicle roof FD, from a closure position into an open position in order to thus release the roof opening DOE of the vehicle roof FD. To this end, the arrangements AO have deployment means. For opening, the cover D is pushed over a rear portion of the vehicle roof FD. To this end, it is necessary for the cover D to be raised since it terminates in the closure position in a flush manner with the upper side of the vehicle roof FD. In a typical movement sequence, a rear edge HK of the cover D is first deployed. This intermediate position is also referred to as the ventilator position. During the further sequence of the opening movement, the cover D is also raised at a front edge VK and subsequently displaced backward in the longitudinal direction of the vehicle.

This typical movement sequence is produced by means of the arrangements AO for a vehicle roof FD which are described in greater detail with reference to the following FIGS. 2 to 6. In the following Figures, only one arrangement AO is illustrated at a side with the associated mechanism. All components are, however, arranged in a mirror-symmetrical manner with respect to a longitudinal center axis at both sides of the roof opening DOE. An arrangement AO can also be referred to as a deployment device.

In FIG. 2, the kinematic principle of the arrangement AO is first drawn and described. For displacing and opening the cover D, the arrangement AO has deployment means in order, for example, to raise and displace the cover D in the region of the rear edge HK thereof. It should be noted that FIGS. 2 to 6 only illustrate a cover carrier DT, which is mechanically coupled to the cover D, preferably by means of screw connections. Consequently, the cover D is directly coupled and can be moved by means of the arrangement AO. A displacement of the cover D is accordingly equivalent to a displacement of the cover carrier DT.

The deployment means of the arrangement AO comprise a first control lever SH1, a second control lever SH2 and a displaceable sliding member S having a fixed first slotted guide K1. The slotted guide K1 can accordingly be displaced with the sliding member S relative to the vehicle roof FD. The deployment means further comprise a second slotted guide K2 which is secured to the vehicle and two additional slotted guides K3 and K4 which are secured to the vehicle. It should be noted that the slotted guides K1 to K4 which are illustrated with reference to FIG. 2 are shown in a linear manner in a dot-dash illustration. In a real embodiment, the slotted guides K1 to K4 are constructed as a groove or recesses in a plastics material or metal component. Alternatively, in the plastics material or metal component, there can also be formed an edge which can act as a slotted guide guide.

FIG. 2 further illustrates a coordinate system which shows the directions Z and X. The X direction may in this instance also be referred to as a longitudinal vehicle direction or horizontal direction. The Z direction may also be referred to as a vertical direction.

The first control lever SH1 has a first engagement element EG1 and a second engagement element EG2 and is pivotably supported in a first bearing L1 on the cover carrier DT. The two engagement elements EG1 and EG2 are permanently, that is to say, durably, in engagement with the first slotted guide K1. The sliding member S is, for example, a sliding element which is displaceably supported in a guide rail in the X direction. The sliding member S is coupled to a drive, such as, for example, an electric motor, which can displace the sliding member S inside the guide rail FS in an opening direction OR substantially parallel with the X direction.

In a rear portion, the first slotted guide K1 has a path which has substantially three portions. Starting from a first portion AS1, which extends substantially parallel with the X direction, a second portion AS2 is adjacent and the distance with respect to the cover D in the closure position of the cover D toward the rear, that is to say, in the Z direction, increases therein. The second portion AS2 is adjoined by a third portion AS3 which in turn extends substantially parallel with the X direction. In this instance, the third portion AS3 has, in comparison with the first portion AS1, a greater distance with respect to the cover D. In a front portion, the first slotted guide K1 has a path which, starting from the first portion AS1 of the rear portion extending substantially parallel with the longitudinal vehicle direction, opens into an additional, fourth portion AS4 in which the distance with respect to the cover D increases in the closure position of the cover D.

In the closure position of the cover D, which position is shown with reference to FIG. 2 and in which the cover D terminates flush with an upper side of the vehicle roof FD, the first engagement element EG1 is located in the third portion AS3 and the second engagement element EG2 is located in the first portion AS1 of the rear portion of the first slotted guide K1. Consequently, the two engagement elements EG1 and EG2 are located in different planes parallel with the cover carrier DT or cover D. In this instance, the first engagement element EG1 which is arranged closer to the first bearing L1 is arranged with a larger distance with respect to the cover, that is to say, in the Z direction. During the typical opening movement of the cover D, the two engagement elements EG1 and EG2 are first moved into the common plane of the first portion AS1 of the rear portion of the first slotted guide K1, whereby a pivot movement of the first control lever SH1 about the first bearing L1 of the cover carrier DT is carried out. This is shown with reference to FIGS. 5 and 6.

The first control lever SH1 additionally has another engagement element EG5 (see FIG. 3) which is in engagement with the second slotted guide K2. In this instance, the additional engagement element EG5 is not illustrated in FIG. 2 for reasons of clarity. The additional engagement element EG5 is located in this instance in the closure position of the cover D with a smaller distance with respect to the cover D than the first engagement element EG1. The second slotted guide K2 which is secured to the vehicle, that is to say, mechanically secured in a fixed manner in the vehicle roof FD, has in a front portion a first portion AS5 which extends to the rear with increasing distance from the cover D. The first portion AS5 of the second slotted guide is adjoined by a second portion AS6 which extends substantially parallel with the X direction or in the longitudinal direction of the vehicle.

Alternatively, the second slotted guide could also have a transposed path in the first portion AS5 which extends to the rear with distance which becomes smaller with respect to the cover D. The additional engagement element EG5 has in this instance in the closure position of the cover D a larger distance with respect to the cover D than the second engagement element EG2.

Using the second slotted guide K2, an X locking of the cover D in the closure position is produced. In particular, when the sliding member S is displaced by means of the second slotted guide K2, a displacement of the cover D in the opening direction OR, that is to say, substantially parallel with the X direction, is initially blocked or prevented. In cooperation with the first slotted guide K1, when the sliding member S is displaced, therefore, a deployment of the cover D in a vertical direction is initially controlled.

At the front edge VK of the cover D, the second control lever SH2 is pivotably supported in a second bearing L2. The second control lever SH2 has two additional engagement elements, that is to say, a third engagement element EG3 and a fourth engagement element EG4 which are each in engagement in another slotted guide which is secured to the vehicle, that is to say, a third slotted guide K3 or a fourth slotted guide K4. In this instance, the third slotted guide K3 has a path which, starting from a short portion extending parallel, opens in an adjacent additional portion in which the distance with respect to the cover D is reduced in the closure position of the cover D. Finally, the path of the third slotted guide K3 opens in turn in a region which extends substantially parallel with the longitudinal direction of the vehicle. The fourth slotted guide K4 has a substantially opposing path. However, the fourth slotted guide K4 may also extend exclusively parallel with the longitudinal direction of the vehicle. In particular by means of the third slotted guide K3, the S movement of the cover D as described in the introduction can be achieved in the region of the front edge VK of the cover D.

The engagement elements EG1 to EG5 described are constructed, for example, as rotary sliding elements. Other alternative embodiments are conceivable.

Using the arrangement AO which is shown with reference to FIG. 2, a first deployment movement path AB1 can be produced in the region of the rear edge HK of the cover D and a second deployment movement path AB2 can be produced in the region of the front edge VK. The two deployment movement paths AB1 and AB2 represent the beginning of the movement paths of the two cover edges VK and HK. In this instance, the second deployment movement path AB2 substantially corresponds to the S path. During the typical movement sequence, the cover D is pivoted in accordance with the deployment movement path AB1 initially when the sliding member S is displaced in a vertical direction, whilst the cover D is locked in the X direction, before the cover D is subsequently displaced in the X direction. The typical movement sequence of the cover D during release and opening of the roof opening DOE is described with reference to FIGS. 4 to 6.

The slotted guide paths of the slotted guides K1 to K4 shown with reference to FIG. 2 substantially show the paths which the engagement elements EG1 to EG5 assume when opening the cover D. It should be noted that the engagement elements EG3 to EG5 do not necessarily have to be guided completely or permanently in the corresponding slotted guides during the movement sequence. For example, the additional engagement element EG5, which is guided in the second slotted guide K2 which is secured to the vehicle, may only be guided in the slotted guide in the portions AS5 and AS6 and may then decouple from the slotted guide guide, wherein after the decoupling the movement direction is predetermined somewhere else, for example, based on the first slotted guide K1 and the associated orientation of the first control lever SH1. In addition, it should be noted that the paths of the slotted guides K1 to K4 in the regions in which, in the closure position of the cover D, the distance with respect to the cover D is changed, may extend in a curved and/or ramp-like manner. Consequently, in particular a low-noise and low-wear movement sequence can be achieved.

FIG. 3 is a schematic, perspective view of the arrangement AO in a possible structural configuration. The arrangement AO is in this instance shown as an exploded view. In particular, the additional engagement element EG5 of the first control lever SH1 can be seen. Furthermore, there is illustrated the second slotted guide K2, with which the additional engagement element EG5 is in engagement in the closure position of the cover D. Furthermore, there are illustrated sliding elements GE which are arranged on the sliding member S and which are configured to guide the sliding member S in a guide rail FS. Consequently, a displacement of the sliding member S by means of the drive in the X direction or longitudinal direction of the vehicle is possible.

The typical movement sequence for releasing the roof opening DOE is explained below with reference to FIGS. 4 to 6. The arrangement AO is illustrated in FIGS. 4 to 6 in a two-dimensional manner, wherein covered elements such as, for example, the slotted guides K1 to K4 are illustrated with dashed lines.

In this instance, FIG. 4 shows a closure position of the cover D. As already described, the engagement elements EG1 and EG2 are located in different planes of the first slotted guide K1 of the sliding member S. The additional engagement element EG5 is in engagement in the second slotted guide K2 which is secured to the vehicle. In the shown position of the arrangement AO, a pivoting or displacement of the cover D is not possible without driving the sliding member S. This means that the cover D is locked in its position. This is ensured in particular by the additional engagement element EG5 being guided in the second slotted guide K2 and substantially preventing a movement in the X direction. In addition, the first engagement element EG1 is in the third portion AS3 in the rear portion of the first slotted guide K1. Consequently, a movement of the cover D in the vertical direction is substantially prevented. Consequently, no additional elements or levers are required to lock the cover in the closure position counter to unauthorized opening. In addition, a compact configuration of the elements is possible so that only a small amount of structural space is required for the arrangement AO, in particular in the direction perpendicular to the image plane of FIG. 4.

If the sliding member S is now displaced in the opening direction OR by means of the drive, the cover D is vertically deployed in the Z direction in the rear region thereof whilst a movement in the X direction is substantially locked. This position is also referred to as the ventilator position of the cover D and is illustrated with reference to FIG. 5. Since the first control lever SH1 having the additional engagement element EG5 is in engagement with the second slotted guide K2, the cover D is in this instance substantially not displaced in the X direction. As a result of the displacement of the sliding member S, it is possible for the first engagement element EG1 also to move in the first portion AS1 of the first slotted guide K1 and consequently for the second engagement element EG2 to be located in the same plane. The vertical movement of the cover D in accordance with the first deployment movement path AB1 of the rear edge HK as illustrated in FIG. 2 is thereby achieved.

If the sliding member S is displaced further in the opening direction OR, the second engagement element EG2 slides in the portion AS4 of the front portion of the first slotted guide K1. The distance of the second engagement element EG2 from the cover D thereby increases so that the cover D is deployed further in the vertical direction. Since the additional engagement element EG5 is connected rigidly to the first control lever SH1, the additional engagement element EG5 is displaced in the second slotted guide K2 in a similar manner to the second engagement element EG2 in a downward direction, that is to say, in a negative Z direction, wherein the distance of the additional engagement element EG5 from the cover D is increased. The additional engagement element EG5 thereby reaches the portion AS6 of the second slotted guide K2 extending parallel with the vehicle direction. Consequently, a movement of the cover D in the X direction is released. It should be noted that the additional engagement element EG5 can be decoupled out of the second slotted guide K2 after reaching the substantially parallel-extending portion AS6 of the second slotted guide K2.

If the sliding member S is displaced further in the opening direction OR, the third engagement element EG3 in the third slotted guide K3 is displaced in the longitudinal direction of the vehicle so that the S movement of the front edge VK of the cover D is achieved. This is a result of the fact that the sliding member S now carries the cover carrier DT since the first control lever SH1 can no longer be displaced relative to the sliding member S and in particular the second engagement element EG2 is located in an end position within the first slotted guide K1 in the portion AS4. The cover D is now located in the completely deployed position thereof which is illustrated with reference to FIG. 6. The additional engagement element EG5 is decoupled from the second slotted guide K2. Since the first control lever SH1 is now located in a rigid position with respect to the sliding member S, a pivoting of the first control lever SH1 about the first bearing L1 and consequently also a pivoting of the second control lever SH2 about the second bearing L2 is substantially no longer possible. It is thereby also possible for the third engagement element EG3 to be able to be decoupled from the third slotted guide K3. The sliding member S can now be displaced in the X direction as far as an end position so that the cover D is moved into an open position.

All the components and elements which are illustrated can be changed and varied in terms of their explicit shape, wherein the basic mechanical and kinematic operating principle of the arrangement AO as explained herein is retained.

LIST OF REFERENCE NUMERALS

AB1 First deployment movement path
AB2 Second deployment movement path
AO Arrangement
AS1 to AS6 Portions
BA Securing portion
D Cover
DE Roof element
DOE Roof opening
DRA Roof frame portion
DT Cover carrier
EG1 to EG5 Engagement elements
F Vehicle
FD Vehicle roof
FS Guide rail
GE Sliding elements
HK Rear edge
K1 First slotted guide
K2 Second slotted guide
K3 Third slotted guide
K4 Fourth slotted guide
L1 Bearing
L2 Bearing
OR Opening direction
S Sliding member
SH1 First control lever
SH2 Second control lever
VK Front edge
X Direction
Z Direction

The invention claimed is:

1. An arrangement for a vehicle roof having a cover which, starting from a closure position for closing a roof opening, can be raised for opening by deployment means in the rear region thereof and which can be displaced backward over the vehicle roof into an open position, wherein the deployment means:
  have a sliding member which can be displaced in the longitudinal direction of the vehicle by means of a drive and which has a first slotted guide;
  have a second slotted guide which is secured to the vehicle; and
  have a first control lever which is pivotably supported in the rear region on the cover and which is coupled to the first slotted guide and the second slotted guide; so that, starting from the closure position of the cover, when the sliding member is displaced in the longitudinal direction of the vehicle, a movement of the cover in the longitudinal direction of the vehicle is initially locked by means of the first control lever;
  wherein the first control lever has three engagement elements for coupling to the first slotted guide and the second slotted guide, wherein two engagement elements are in engagement with the first slotted guide and one engagement element is in engagement with the second slotted guide.

2. The arrangement according to claim 1, wherein, in the closure position of the cover, a path of the second slotted guide extends in a front portion in such a manner that a distance between the second slotted guide and the cover changes and subsequently the distance between the second slotted guide and the cover remains substantially the same and wherein, in the closure position of the cover, the first slotted guide has in a front portion a path in which the distance changes with respect to the cover.

3. The arrangement according to claim 1, wherein, in the closure position of the cover, a path of the first slotted guide extends in a rear portion in such a manner that a distance between the first slotted guide and the cover increases in a backward direction.

4. The arrangement according to claim 1, wherein the rear portion of the first slotted guide and/or the front portion of the second slotted guide has/have a curved and/or ramp-like path.

5. The arrangement according to claim 1, wherein the two engagement elements which are in engagement with the first slotted guide are arranged in different planes parallel with the cover in the closure position of the cover.

6. The arrangement according to claim 1, wherein the rear portion of the first slotted guide has a first portion which extends substantially parallel with the longitudinal direction of the vehicle, a second portion which adjoins the first portion and which extends in a ramp-like and/or curved manner, and a third portion which adjoins the second portion and which extends substantially parallel with the longitudinal direction of the vehicle, wherein the first portion in comparison with the third portion has a smaller distance with respect to the cover.

7. The arrangement according to claim 6, wherein, in the closure position of the cover, one of the two engagement elements which is in engagement with the first slotted guide and which is located closer to a fixed bearing of the first control lever is located in the third portion and the other of the two engagement elements is located in the first portion.

8. The arrangement according to claim 1, wherein the front portion of the second slotted guide has a first portion which extends backward with increasing distance from the cover, and a second portion which adjoins the first portion and which extends substantially parallel with the longitudinal direction of the vehicle.

9. The arrangement according to claim 1, wherein the deployment means further have a second control lever which in a front region is pivotably supported on the cover has two additional engagement elements which are each in engagement with another slotted guide which is secured to the vehicle, wherein at least one slotted guide which is secured to the vehicle in a front portion has a path with distance which decreases to the rear with respect to the cover.

10. The arrangement according to claim 1, wherein the engagement elements are constructed as sliding elements.

\* \* \* \* \*